US012634176B2

(12) United States Patent
Kim et al.

(10) Patent No.: US 12,634,176 B2
(45) Date of Patent: May 19, 2026

(54) DECISION FEEDBACK EQUALIZER FOR MINIMIZING NUMBER OF COMPARATORS IN DECODER AND OPERATION METHOD THEREOF

(71) Applicant: KOREA UNIVERSITY RESEARCH AND BUSINESS FOUNDATION, Seoul (KR)

(72) Inventors: Chulwoo Kim, Seoul (KR); Hyo Shin Kang, Seoul (KR); Yoon Jae Choi, Seoul (KR); Hwaseok Shin, Seoul (KR); Chang-Min Sim, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 18/782,901

(22) Filed: Jul. 24, 2024

(65) Prior Publication Data

US 2025/0039020 A1     Jan. 30, 2025

(30) Foreign Application Priority Data

Jul. 25, 2023     (KR) ........................ 10-2023-0096721

(51) Int. Cl.
H04L 25/03          (2006.01)

(52) U.S. Cl.
CPC .............................. H04L 25/03057 (2013.01)

(58) Field of Classification Search
CPC .... H04B 1/10; H04B 1/16; H04B 1/30; H04L 25/03006; H04L 25/03019; H04L 25/03057; H04L 25/03267

(Continued)

(56) References Cited

U.S. PATENT DOCUMENTS

| | | | |
|---|---|---|---|
| 9,473,330 | B1 | 10/2016 | Francese |
| 10,097,383 | B1 | 10/2018 | Bulzacchelli et al. |

(Continued)

FOREIGN PATENT DOCUMENTS

| | | |
|---|---|---|
| JP | 2020-48060 A | 3/2020 |
| KR | 10-1872310 B1 | 7/2018 |

(Continued)

OTHER PUBLICATIONS

Office Action dated Aug. 5, 2024 for corresponding Korean Patent Application No. 10-2023-0096721, along with an English machine translation (14 pages).

(Continued)

*Primary Examiner* — Young T. Tse
(74) *Attorney, Agent, or Firm* — Hauptman Ham, LLP

(57)          ABSTRACT

Disclosed is a decision feedback equalizer, which includes a summator that receives a gray code-based PAM-4 signal, a first bit signal, and a second bit signal, and outputs an input voltage obtained by adding a preset coefficient to a voltage level of the PAM-4 signal in response to the first bit signal and the second bit signal, and a decoder that receives the input voltage and first to third reference voltages of the PAM-4 signal and outputs the first bit signal and the second bit signal, and the decoder includes a first comparator that outputs the first bit signal by comparing a magnitude of the input voltage with a magnitude of the first reference voltage, and a second comparator that outputs the second bit signal by comparing charge-discharge intensities of the input voltage and the second and third reference voltages.

10 Claims, 8 Drawing Sheets

(58) Field of Classification Search
USPC ....... 375/232, 233, 242, 243, 340, 346, 348, 375/350, 353; 708/322, 323
See application file for complete search history.

(56) References Cited

U.S. PATENT DOCUMENTS

| | | | |
|---|---|---|---|
| 2013/0094561 A1* | 4/2013 | Raphaeli | H04L 25/03057 375/233 |
| 2013/0195155 A1* | 8/2013 | Pan | H03D 1/00 375/317 |
| 2018/0248577 A1* | 8/2018 | Hossain | H04L 25/0264 |
| 2020/0007379 A1* | 1/2020 | Patil | H04L 27/06 |
| 2021/0242861 A1 | 8/2021 | Sun | |
| 2022/0077830 A1* | 3/2022 | Duan | H04L 25/03878 |
| 2023/0054834 A1* | 2/2023 | Manjunath | H04L 25/4917 |
| 2024/0106687 A1* | 3/2024 | Shay | H04L 25/03885 |

FOREIGN PATENT DOCUMENTS

| | | |
|---|---|---|
| KR | 10-2022-0050663 A | 4/2022 |
| KR | 10-2478277 B1 | 12/2022 |
| KR | 10-2023-0029887 A | 3/2023 |
| WO | 2019/155582 A1 | 8/2019 |

OTHER PUBLICATIONS

Dengjie Wang, "A 56-Gbps PAM-4 Wireline Receiver With 4-Tap Direct DFE Employing Dynamic CML Comparators in 65 nm CMOS", IEEE Transactions on Circuits and Systems, vol. 69, No. 3, Mar. 2022, pp. 1027-1040.

Office Action dated Jul. 8, 2025 for corresponding Japanese Patent Application No. 2024-118868, along with an English machine translation (22 pages).

The extended European Search Report dated Dec. 20, 2024 for corresponding European Patent Application No. 24190937.3, 10 pages.

Kuan-Chang Chen et al., "A 60-Gb/s PAM4 Wireline Receiver With 2-Tap Direct Decision Feedback Equalization Employing Track-and-Regenerate Slicers in 28-mn CMOS", IEEE Journal of Solid-State Circuits, vol. 56, No. 3, Mar. 2021, pp. 750-762.

Guang Zhu et al., "A Low-Power PAM4 Receiver Using 1/4-Rate Sampling Decoder with Adaptive Variable-Gain Rectification", IEEE Asian Solid-State Circuits Conference, Seoul, KRX, Nov. 6-8, 2017, pp. 81-84.

Jincheol Sim et al., "PAM-4 Receiver With 1-Tap DFE Using Clocked Comparator Offset Instead of Threshold Voltages for Improved LSB BER Performance", IEEE Transactions on Circuits and Systems I: Regular Papers, vol. 70, No. 5, May 1, 2023, pp. 1907-1916.

* cited by examiner

1

DECISION FEEDBACK EQUALIZER FOR MINIMIZING NUMBER OF COMPARATORS IN DECODER AND OPERATION METHOD THEREOF

CROSS-REFERENCE TO RELATED APPLICATIONS

This application claims priority under 35 U.S.C. § 119 to Korean Patent Application No. 10-2023-0096721 filed on Jul. 25, 2023, in the Korean Intellectual Property Office. The aforementioned application is hereby incorporated by reference in its entirety.

BACKGROUND

Embodiments of the present disclosure described herein relate to a decision feedback equalizer capable of minimizing the number of comparators in a PAM-4 decoder and an operation method thereof.

Recently, as a transmission speed of wired transceivers has increased, the hardware cost to transmit high-speed clocks to entire chips is increasing, and power consumption is also increasing. Accordingly, technology using a multiphase architecture is required for transceivers to process vast amounts of data signals transmitted at high speeds.

To this end, the transceiver may include a continuous time linear equalizer, a decision feedback equalizer, etc. However, due to the increasing the number of comparators in the decoder, there are issues that power consumption in data paths and clock paths increases and a bandwidth is limited.

SUMMARY

Embodiments of the present disclosure provide a decision feedback equalizer for minimizing the number of comparators in a PAM-4 decoder and an operation method thereof.

According to an embodiment of the present disclosure, a decision feedback equalizer includes a summator that receives a gray code-based PAM-4 signal, a first bit signal, and a second bit signal, and outputs an input voltage obtained by adding a preset coefficient to a voltage level of the PAM-4 signal in response to the first bit signal and the second bit signal, and a decoder that receives the input voltage and a first reference voltage, a second reference voltage, and a third reference voltage of the PAM-4 signal and outputs the first bit signal and the second bit signal, and the decoder includes a first comparator that outputs the first bit signal by comparing a magnitude of the input voltage with a magnitude of the first reference voltage, and a second comparator that outputs the second bit signal by comparing charge-discharge intensities of the input voltage and the second and third reference voltages.

According to an embodiment, the second comparator, when the input voltage is greater than the second reference voltage and less than the third reference voltage, may output the second bit signal as "0", and the second comparator, when the input voltage is less than the second reference voltage and greater than the third reference voltage, may output the second bit signal as "1".

According to an embodiment, the summator may include a first tap that outputs an odd signal of the input voltage using odd bits of the first and second bit signals, and a second tap that outputs an even signal of the input voltage using even bits of the first and second bit signals.

According to an embodiment, the summator, when the first and second bit signals are "1" and "0", respectively, may add a first coefficient to the voltage level of the PAM-4 signal, the summator, when the first and second bit signals are "1" and "1", respectively, may add a second coefficient to the voltage level of the PAM-4 signal, the summator, when the first and second bit signals are "0" and "1", respectively, may add a third coefficient to the voltage level of the PAM-4 signal, and the summator, when the first and second bit signals are "0" and "0", respectively, may add a fourth coefficient to the voltage level of the PAM-4 signal.

According to an embodiment, the decision feedback equalizer may further include a continuous time linear equalizer that receives a data signal, uniformly equalizes all frequency components of the data signal, and outputs the PAM-4 signal, a variable gain amplifier that receives the PAM-4 signal and amplifies intervals between the voltage level of the PAM-4 signal and the first to third reference voltages, and a compensation circuit that keeps a common mode of the summator uniform.

According to an embodiment of the present disclosure, a method of operating a decision feedback equalizer, includes receiving a gray code-based PAM-4 signal, a first bit signal, and a second bit signal, and outputting an input voltage obtained by adding a preset coefficient to a voltage level of the PAM-4 signal in response to the first bit signal and the second bit signal, and receiving the input voltage and first to third reference voltages of the PAM-4 signal, and outputting the first bit signal and the second bit signal, and the outputting of the first bit signal and the second bit signal includes outputting the first bit signal by comparing a magnitude of the input voltage with a magnitude of the first reference voltage, and outputting the second bit signal by comparing charge-discharge intensities of the input voltage and the second and third reference voltages.

According to an embodiment, the outputting of the second bit signal, when the input voltage is greater than the second reference voltage and less than the third reference voltage, may include outputting the second bit signal as "0", and when the input voltage is less than the second reference voltage and greater than the third reference voltage, may include outputting the second bit signal as "1".

According to an embodiment, the outputting of the input voltage may include outputting an odd signal of the input voltage using odd bits of the first and second bit signals, and outputting an even signal of the input voltage using even bits of the first and second bit signals.

According to an embodiment, the outputting of the input voltage may include, when the first and second bit signals are "1" and "0", respectively, adding a first coefficient to the voltage level of the PAM-4 signal, when the first and second bit signals are "1" and "1", respectively, adding a second coefficient to the voltage level of the PAM-4 signal, when the first and second bit signals are "0" and "1", respectively, adding a third coefficient to the voltage level of the PAM-4 signal, and when the first and second bit signals are "0" and "0", respectively, adding a fourth coefficient to the voltage level of the PAM-4 signal.

According to an embodiment, the method may further include receiving a data signal, uniformly equalizing all frequency components of the data signal, and outputting the PAM-4 signal, receiving the PAM-4 signal and amplifying intervals between the voltage level of the PAM-4 signal and the first to third reference voltages, and keeping a common mode of the outputting the input voltage uniform.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described in detail and clearly to such an extent that an ordinary one in the art easily implements the present disclosure.

Figure 1:
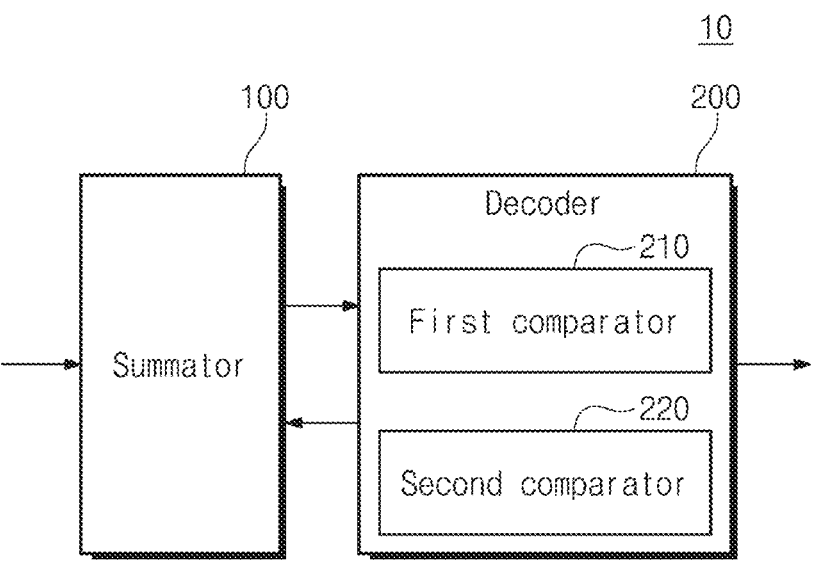
FIG. 1 is a block diagram illustrating a decision feedback equalizer, according to an embodiment of the present disclosure.

FIG. 1 is a block diagram illustrating a decision feedback equalizer, according to an embodiment of the present disclosure.

A decision feedback equalizer 10 according to an embodiment of the present disclosure may be implemented in a receiving device that receives a 4-Level Pulse Amplitude Modulation (PAM-4) signal in Gray Code. For example, the decision feedback equalizer 10 may be implemented in the receiving device of various devices such as desktop computers, laptop computers, tablet computers, smart phones, wearable devices, video game consoles, home appliances, medical devices, etc.

To be described in more detail with reference to FIG. 1, the decision feedback equalizer 10 according to an embodiment of the present disclosure includes a summator 100 and a decoder 200.

The summator 100 may receive a PAM-4 signal based on the Gray code and first and second bit signals, and may output an input voltage obtained by adding a preset coefficient to a voltage level of the PAM-4 signal in response to the first and second bit signals.

The decoder 200 may receive the input voltage and first to third reference voltages of the PAM-4 signal, and may output the first and second bit signals. To this end, the decoder 200 includes a first comparator 210 and a second comparator 220.

The first comparator 210 may compare a magnitude of the input voltage with a magnitude of the first reference voltage and may output the first bit signal as "0" or "1". For example, the first comparator 210 may output the first bit signal as "1" when the input voltage is greater than the first reference voltage, and may output the first bit signal as "0" when the input voltage is less than the first reference voltage.

The second comparator 220 may compare charge-discharge intensities of the input voltage and the second and third reference voltages and may output the second bit signal as "0" or "1". For example, the second comparator 220 may output the second bit signal as "0" when the input voltage is greater than the second reference voltage and less than the third reference voltage, and may output the second bit signal as "1" when the input voltage is less than the second reference voltage and greater than the third reference voltage. A more detailed description of the first and second comparators 210 and 220 will be provided in FIGS. 4A and 4B.

As described above, the decision feedback equalizer 10 according to an embodiment of the present disclosure may decode data through the first and second comparators 210 and 220 of the decoder 200, and the decoder 200 may feedback the first and second bit signals, which are Return-To-Zero (RZ) data, to the summator 100. Accordingly, the decoder 200 may reduce a feedback loop delay of the decoder 200 by omitting the additional process of converting to NRZ (Non-Return-To-Zero) data.

Figure 2:
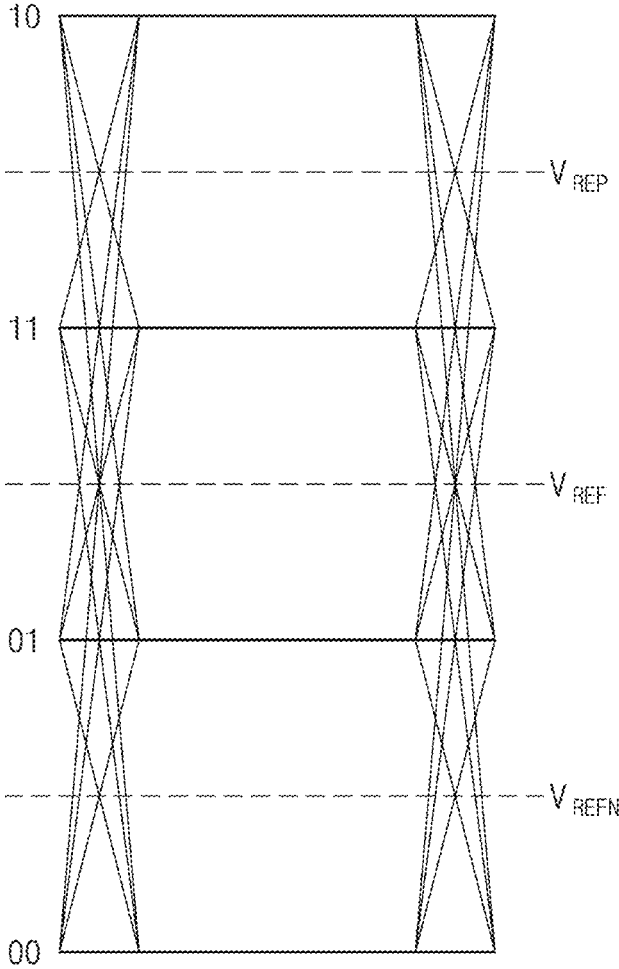
FIG. 2 is a diagram describing first to third reference voltages of a PAM-4 signal, according to an embodiment of the present disclosure.

FIG. 2 is a diagram describing first to third reference voltages of a PAM-4 signal, according to an embodiment of the present disclosure.

Referring to FIG. 2, the lowest first level of the PAM-4 signal may be mapped to 2-bit data '00', and the highest fourth level of the PAM-4 signal may be mapped to 2-bit data '10'. A second level of the PAM-4 signal may be mapped to 2-bit data '01', and a third level of the PAM-4 signal may be mapped to 2-bit data '11'. In addition, a first reference voltage VREF of the PAM-4 signal may be a voltage level between the second level and the third level, a second reference voltage VREFP of the PAM-4 signal may be a voltage level between the third level and the fourth level, and a third reference voltage VREFN of the PAM-4 signal may be a voltage level between the first level and the second level. The mapping between the first to fourth levels and data described above is a mapping according to the Gray Code method, this is only an example, and the mapping may be changed according to various purposes.

Figure 3:
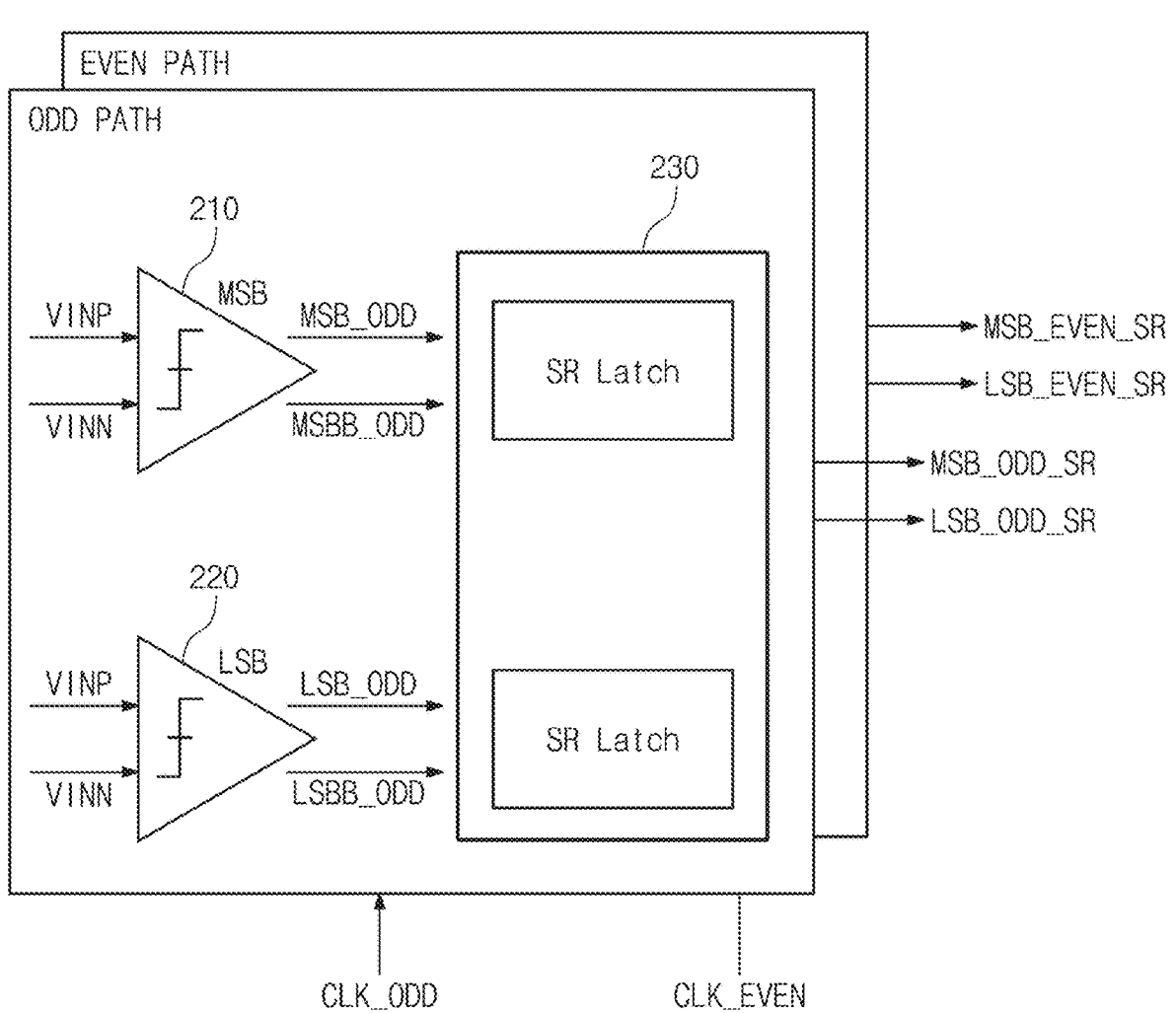
FIG. 3 is a block diagram illustrating an example of a comparator, according to an embodiment of the present disclosure.

FIG. 3 is a block diagram illustrating an example of a comparator, according to an embodiment of the present disclosure.

Referring to FIG. 3, the decoder 200 may implement an even path and an odd path to decode a first bit signal MSB and a second bit signal LSB. Meanwhile, the even path and the odd path of the decoder 200 are the same path with the only difference being the bit signal. Therefore, hereinafter, for convenience of description, the odd path will be representatively described.

The first comparator 210 of the odd path may output first odd bit signals MSB_ODD and MSBB_ODD for input voltages VINP and VINN in response to an odd clock signal CLK_ODD.

The second comparator 220 of the odd path may output second odd bit signals LSB_ODD and LSBB_ODD for the input voltages VINP and VINN in response to the odd clock signal CLK_ODD.

The decoder 200 may feedback the first odd bit signals MSB_ODD and MSBB_ODD and the second odd bit signals LSB_ODD and LSBB_ODD to the summator 100. In addition, the decoder 200 may convert the first odd bit signals MSB_ODD and MSBB_ODD and the second odd bit signals LSB_ODD and LSBB_ODD through an SR latch 230 to output odd decoding signals MSB_ODD_SR and LSB_ODD_SR.

As described above, the decoder 200 according to an embodiment of the present disclosure distinguishes the odd path and the even path for the bit signal to facilitate an intuitive expression of the bit value of the PAM-4 signal and a signal recovery.

Figure 4A:
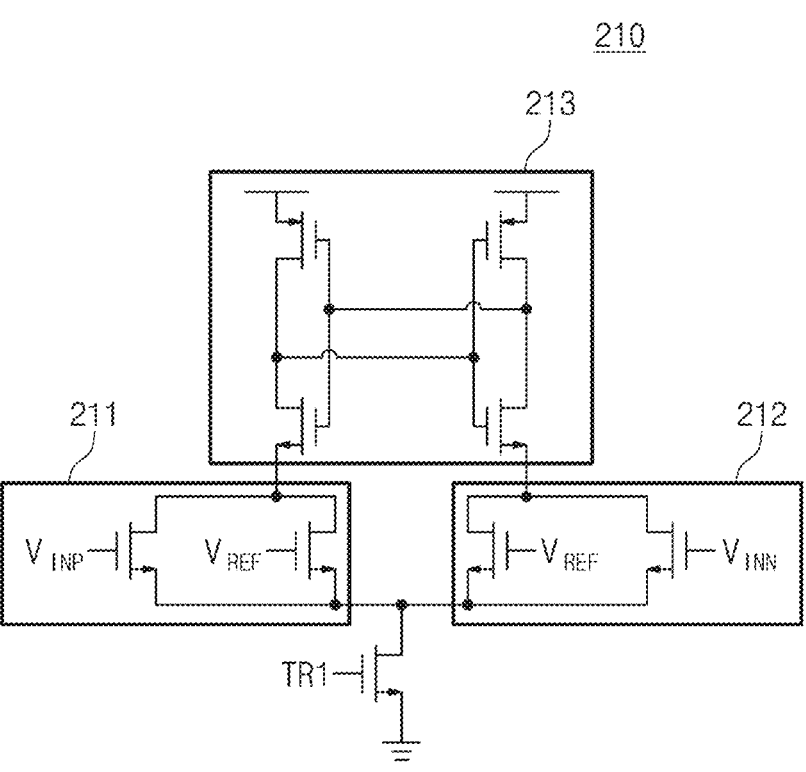
FIGS. 4A and 4B are circuit diagrams illustrating an example of a comparator, according to embodiments of the present disclosure.
Figure 4B:
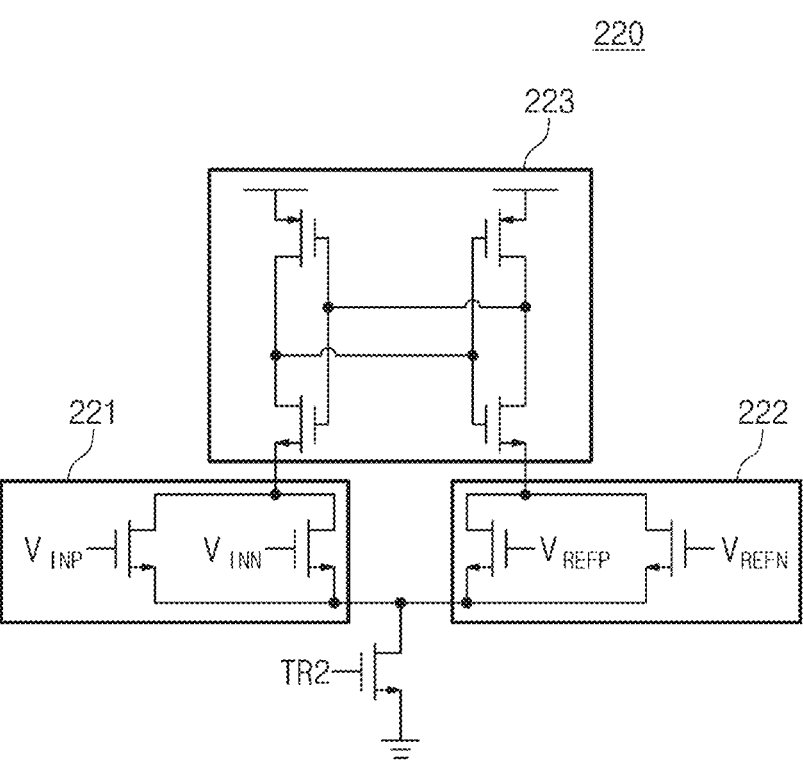

FIGS. 4A and 4B are circuit diagrams illustrating an example of a comparator, according to embodiments of the present disclosure. FIG. 4A is a circuit diagram illustrating an example of the first comparator 210, and FIG. 4B is a circuit diagram illustrating an example of the second comparator 220.

Referring to FIG. 4A, the first comparator 210 may be implemented with a first input terminal 211, a second input terminal 212, and a first output terminal 213. For example, the first input terminal 211 may include a plurality of transistors including gates to which the positive input voltage VINP and the first reference voltage VREF are applied, respectively, and the second input terminal 212 may include a plurality of transistors including gates to which the negative input voltage VINN and the first reference voltage VREF are applied, respectively. In more detail, the first comparator 210 may perform a comparison operation when a first transistor TR1 is turned on in response to a common signal. The first comparator 210 may receive the positive input voltage VINP and the first reference voltage VREF through the first input terminal 211. Additionally, the first comparator 210 may receive the negative input voltage VINN and the first reference voltage VREF through the second input terminal 212. The first comparator 210 may compare the received information of the first input terminal 211 and the second input terminal 212 and may output the first bit signal MSB of "0" or "1" through the first output terminal 213. For example, when an input voltage VINP, VINN is greater than the first reference voltage VREF, the first comparator 210 may output the first bit signal MSB as "1", and when the input voltage VINP, VINN is less than the first reference voltage VREF, the first comparator 210 may output the first bit signal MSB as "0".

Referring to FIG. 4B, the second comparator 220 may be implemented with a third input terminal 221, a fourth input terminal 222, and a second output terminal 223. For example, the third input terminal 221 may include a plurality of transistors including gates to which the positive input voltage VINP and the negative input voltage VINN are applied, respectively, and the fourth input terminal 222 may include a plurality of transistors including gates to which the second reference voltage VREFP and the third reference voltage VREFN are applied, respectively. In more detail, the second comparator 220 may perform a comparison operation when a second transistor TR2 is turned on in response to a common signal. The second comparator 220 may receive the positive input voltage VINP and the negative input voltage VINN through the third input terminal 221. Additionally, the second comparator 220 may receive the second reference voltage VREFP and the third reference voltage VREFN through the fourth input terminal 222. The second comparator 220 may compare the received information of the third input terminal 221 and the fourth input terminal 222 and may output the second bit signal LSB as "0" or "1" through the second output terminal 223.

In more detail, the second comparator 220 may compare different charge-discharge intensities of the third input terminal 221 and the fourth input terminal 222 and may output the second bit signal as "0" or "1". For example, the second comparator 220 may output the second bit signal LSB as "0" when the input voltages VINP and VINN are greater than the second reference voltage VREFP and less than the third reference voltage VREFN. Additionally, the second comparator 220 may output the second bit signal LSB as "1" when the input voltages VINP and VINN are less than the second reference voltage VREFP and greater than the third reference voltage VREFN.

As described above, the decoder 200 according to an embodiment of the present disclosure may output the first bit signal MSB by comparing the magnitude of the input voltages VINP and VINN with the magnitude of the first reference voltage VREF, and the decoder 200 may output the second bit signal LSB by comparing the charge-discharge intensities of the input voltages VINP and VINN and the second and third reference voltages VREFP and VREFN. Accordingly, the decoder 200 may minimize the number of comparators that output the first and second bit signals MSB and LSB and may implement a 1-stage structure that may perform a decision feedback equalization operation.

Figure 5:
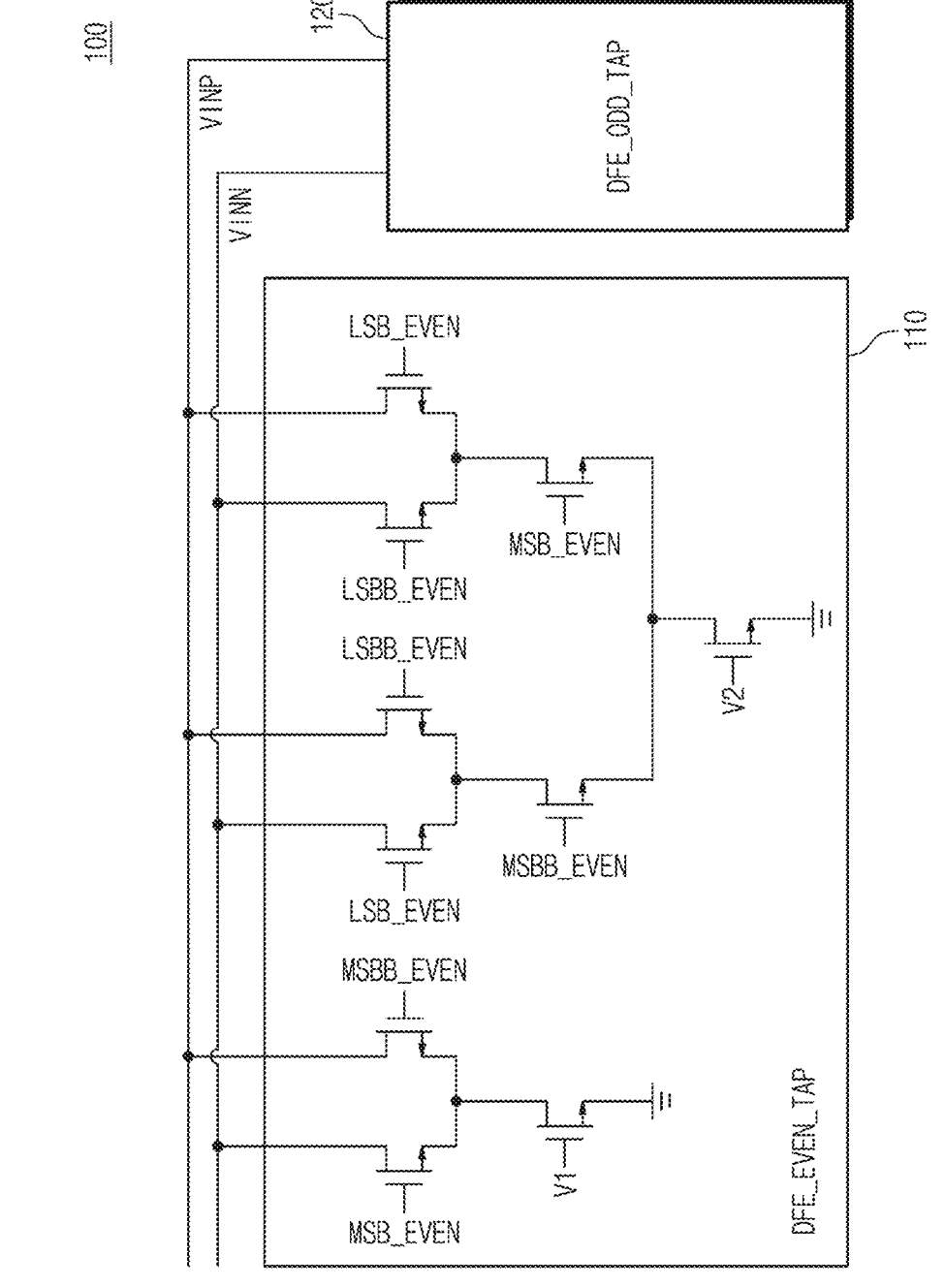
FIG. 5 is a circuit diagram illustrating an example of a summator, according to an embodiment of the present disclosure.

FIG. 5 is a circuit diagram illustrating an example of a summator, according to an embodiment of the present disclosure.

Referring to FIG. 5, the summator 100 may output the input voltages VINP and VINN obtained by adding first to fourth coefficients to the voltage level of the PMA-4 signal in response to the first and second bit signals MSB and LSB. To this end, the summator 100 includes a first tap 110 and a second tap 120. Meanwhile, the first tap 110 and the second tap 120 of the summator 100 are implemented with the same circuit except that bit signals are different from each other. Therefore, hereinafter, for convenience of description, the first tap 110 will be described as a representative example.

The first tap 110 may output an even bit signals of the input voltages VINP and VINN obtained by adding the first to fourth coefficients to the voltage level of the PAM-4 signal using first and second even bit signals MSB_EVEN and LSB_EVEN. For example, the first tap 110 may include a plurality of transistors including gates to which the first and second even bit signals MSB_EVEN and LSB_EVEN and operating voltages V1 and V2 are applied, respectively.

The first tap 110 according to an embodiment of the present disclosure may add the first coefficient to the voltage level of the PAM-4 signal when the first and second even bit signals MSB_EVEN and LSB_EVEN are "1" and "0", respectively, and may add the second coefficient to the voltage level of the PAM-4 signal when the first and second even bit signals MSB_EVEN and LSB_EVEN are "1" and "1", respectively. In addition, when the first and second even bit signals MSB_EVEN and LSB_EVEN are "0" and "1", respectively, the first tap 110 may add the third coefficient to the voltage level of the PAM-4 signal, and when the first and second even bit signals MSB_EVEN and LSB_EVEN are "0" and "0", respectively, the first tap 110 may add the fourth coefficient to the voltage level of the PAM-4 signal. In this case, the first to fourth coefficients which are added to the voltage level of the PAM-4 signal may be +3, +1, −1, and −3, respectively, but are not limited thereto.

Figure 6:
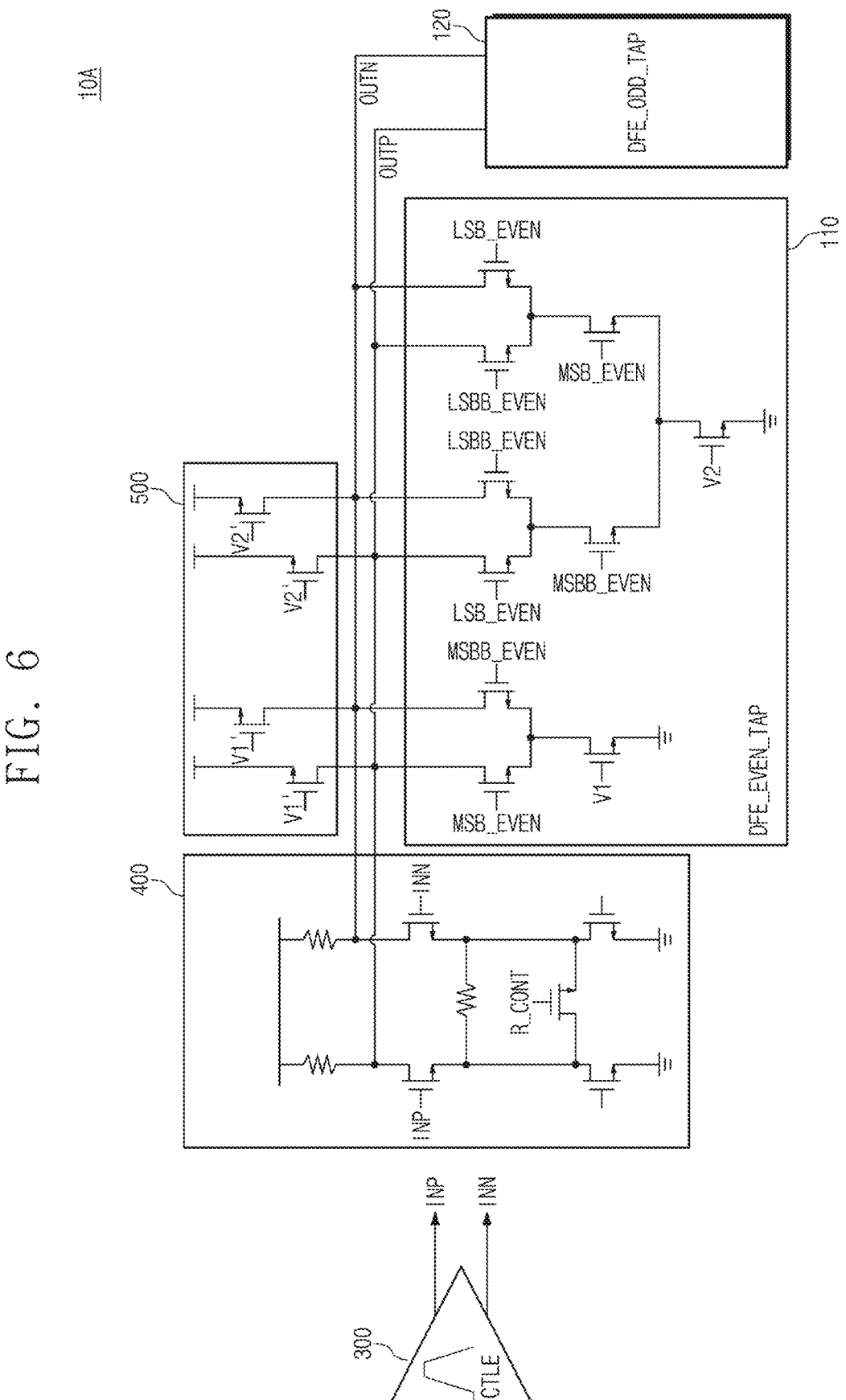
FIG. 6 is a block diagram illustrating another embodiment of a decision feedback equalizer.

FIG. 6 is a block diagram illustrating another embodiment of a decision feedback equalizer.

In detail, FIG. 6 illustrates an example that further includes a continuous time linear equalizer 300, a variable gain amplifier 400, and a compensation circuit 500. The configuration of FIG. 6 other than the above configuration is similar to that of FIG. 5. Therefore, the same or similar other component are denoted using the same or similar reference numerals, and additional descriptions will be omitted to avoid redundancy.

Referring to FIG. 6, a decision feedback equalizer 10A may further include the continuous time linear equalizer 300, the variable gain amplifier 400, and the compensation circuit 500.

The continuous time linear equalizer 300 may receive a data signal from a transmitter, may amplify the magnitude of the high-frequency component of the data signal, and may generate a PAM-4 signal in which all frequency components of the data signal are uniformly equalized. For example, the continuous time linear equalizer 300 may receive the data signal that may represent four data values 00, 01, 10, and 11 and may equalize the data signal by performing a sample/hold operation.

The variable gain amplifier 400 may receive the PAM-4 signal from the continuous time linear equalizer 300 and may amplify intervals between the voltage level of the PAM-4 signal and the first to third reference voltages. For example, the variable gain amplifier 400 may adjust the voltage gain using a variable gain control signal R_CONT for controlling a variable resistance.

The compensation circuit 500 may maintain the common mode uniform. For example, in the decision feedback equalizer 10A, the common mode of the overall circuit is reduced due to the summator 100 generating the charge-discharge. Accordingly, the compensation circuit 500 may maintain the common mode of the overall circuit uniform by pulling up the current applied to the summator 100 using a plurality of PMOS transistors. For example, the compensation circuit 500 may include a plurality of PMOS transistors connected to a plurality of transistors of the first tap 110.

As described above, the decision feedback equalizer 10A does not change the operating range of the circuit and may easily measure the voltage level of the PAM-4 signal and the first to third reference voltages.

Figure 7:
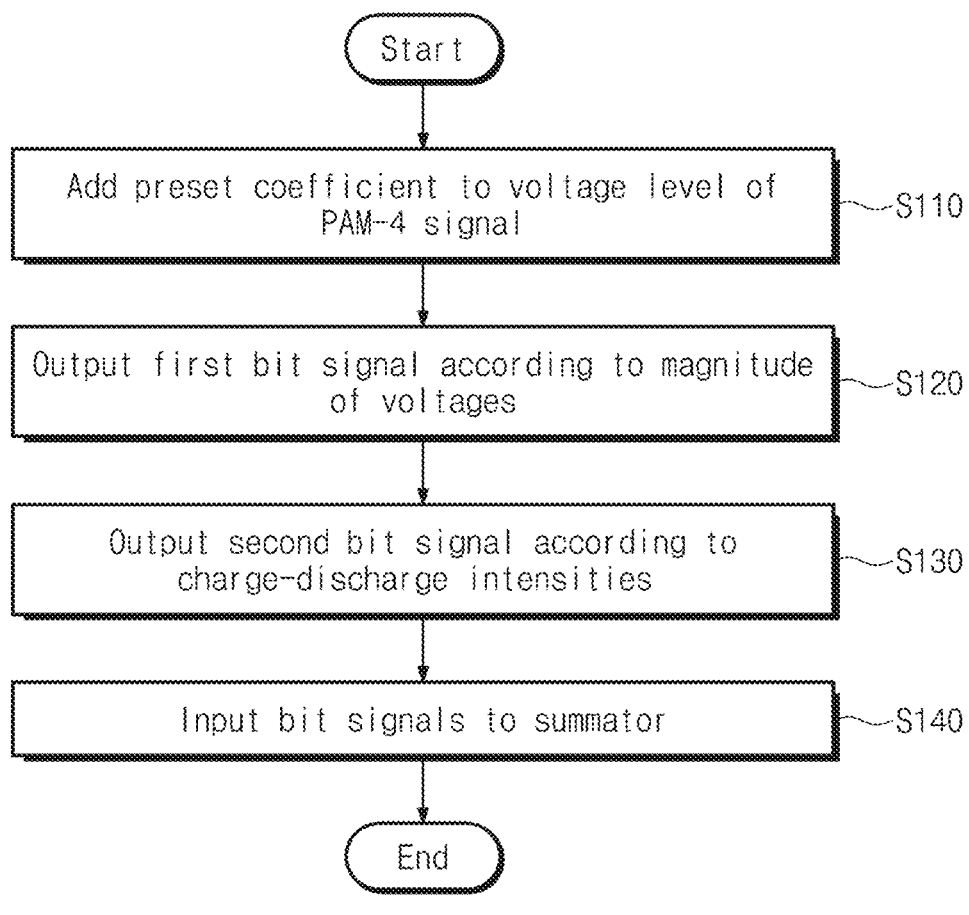
FIG. 7 is a flowchart illustrating an operation of a decision feedback equalizer, according to an embodiment of the present disclosure.

FIG. 7 is a flowchart illustrating an operation of a decision feedback equalizer, according to an embodiment of the present disclosure.

Referring to FIG. 7, in operation S110, the summator 100 may output the input voltages VINP and VINN obtained by adding a preset coefficient to the voltage level of the PAM-4 signal in response to the first and second bit signals MSB and LSB.

In operation S120, the first comparator 210 of the decoder 200 may compare the magnitude of the input voltages VINP and VINN with the first reference voltage VREF and may output the first bit signal MSB.

In operation S130, the second comparator 220 of decoder 200 may compare the charge-discharge intensities of the input voltages VINP and VINN and the second and third reference voltages VREFP and VREFN to output the second bit signal LSB.

In operation S140, the decoder 200 may output the first and second bit signals MSB and LSB, which are the RZ data, as even and odd signals, and may input the output bit signals to the summator 100.

According to an embodiment of the present disclosure, the decision feedback equalizer that minimizes the number of comparators in decoder may implement a decision feedback equalization circuit using the RZ signal. Accordingly, the present disclosure may reduce the power consumption of the overall circuit and may reduce the feedback loop delay.

The above descriptions are detail embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. Therefore, the scope of the present disclosure should not be limited to the above-described embodiments and should be defined by not only the claims to be described later, but also those equivalent to the claims of the present disclosure.

This work was supported by the National Research Foundation of Korea (NRF) grate funded by the Korea government (MSIT) (No. NRF-RS-2023-0281047).

What is claimed is:

1. A decision feedback equalizer comprising:
a summator configured to receive a gray code-based 4-level pulse amplitude modulation (PAM-4) signal, a first bit signal, and a second bit signal, and to output an input voltage obtained by adding a preset coefficient to a voltage level of the PAM-4 signal in response to the first bit signal and the second bit signal; and
a decoder configured to receive the input voltage, a first reference voltage, a second reference voltage, a third reference voltage of the PAM-4 signal, and to output the first bit signal and the second bit signal,
wherein the decoder includes:
a first comparator configured to output the first bit signal by comparing a magnitude of the input voltage with a magnitude of the first reference voltage; and
a second comparator configured to output the second bit signal by comparing charge-discharge intensities of the input voltage and the second and third reference voltages.

2. The decision feedback equalizer of claim 1, wherein the second comparator is further configured to:
when the input voltage is greater than the second reference voltage and less than the third reference voltage, output the second bit signal as "0"; and
when the input voltage is less than the second reference voltage and greater than the third reference voltage, output the second bit signal as "1".

3. The decision feedback equalizer of claim 1, wherein the summator includes:
a first tap configured to output an odd signal of the input voltage using odd bits of the first and second bit signals; and
a second tap configured to output an even signal of the input voltage using even bits of the first and second bit signals.

4. The decision feedback equalizer of claim 1, wherein the summator is further configured to:
when the first and second bit signals are "1" and "0", respectively, add a first coefficient to the voltage level of the PAM-4 signal;
when the first and second bit signals are "1" and "1", respectively, add a second coefficient to the voltage level of the PAM-4 signal;
when the first and second bit signals are "0" and "1", respectively, add a third coefficient to the voltage level of the PAM-4 signal; and
when the first and second bit signals are "0" and "0", respectively, add a fourth coefficient to the voltage level of the PAM-4 signal.

5. The decision feedback equalizer of claim 1, further comprising:
a continuous time linear equalizer configured to receive a data signal, to uniformly equalize all frequency components of the data signal, and to output the PAM-4 signal;
a variable gain amplifier configured to receive the PAM-4 signal and to amplify intervals between the voltage level of the PAM-4 signal and the first to third reference voltages; and
a compensation circuit configured to keep a common mode of the summator uniform.

6. A method of operating a decision feedback equalizer comprising a summator and a decoder, the method comprising:
receiving, by the summator, a gray code-based 4-level pulse amplitude modulation (PAM-4) signal, a first bit signal, and a second bit signal, and outputting an input voltage obtained by adding a preset coefficient to a voltage level of the PAM-4 signal in response to the first bit signal and the second bit signal; and receiving, by the decoder, the input voltage and first to third reference voltages of the PAM-4 signal, and outputting the first bit signal and the second bit signal, wherein the outputting of the first bit signal and the second bit signal includes:

outputting the first bit signal by comparing a magnitude of the input voltage with a magnitude of the first reference voltage; and outputting the second bit signal by comparing charge-discharge intensities of the input voltage and the second and third reference voltages.

7. The method of claim 6, wherein the outputting of the second bit signal further includes:

when the input voltage is greater than the second reference voltage and less than the third reference voltage, outputting the second bit signal as "0"; and when the input voltage is less than the second reference voltage and greater than the third reference voltage, outputting the second bit signal as "1".

8. The method of claim 6, wherein the outputting of the input voltage includes:

outputting an odd signal of the input voltage using odd bits of the first and second bit signals; and outputting an even signal of the input voltage using even bits of the first and second bit signals.

9. The method of claim 6, wherein the outputting of the input voltage includes:

when the first and second bit signals are "1" and "0", respectively, adding a first coefficient to the voltage level of the PAM-4 signal;

when the first and second bit signals are "1" and "1", respectively, adding a second coefficient to the voltage level of the PAM-4 signal;

when the first and second bit signals are "0" and "1", respectively, adding a third coefficient to the voltage level of the PAM-4 signal; and when the first and second bit signals are "0" and "0", respectively, adding a fourth coefficient to the voltage level of the PAM-4 signal.

10. The method of claim 6, further comprising:

receiving a data signal, uniformly equalizing all frequency components of the data signal, and outputting the PAM-4 signal;

receiving the PAM-4 signal and amplifying intervals between the voltage level of the PAM-4 signal and the first to third reference voltages; and keeping a common mode of the outputting of the input voltage uniform.

* * * * *